J. O. BROWN.
SHOCK CARRIAGE ATTACHMENT TO HARVESTERS.

No. 170,230. Patented Nov. 23, 1875.

Witnesses: Inventor:
James O. Brown

UNITED STATES PATENT OFFICE.

JAMES O. BROWN, OF MASSILLON, OHIO, ASSIGNOR OF PART OF HIS RIGHT TO EDWIN BAYLISS, PLINY F. HODGES, AND FRANÇOIS T. LOMONT, OF SAME PLACE.

IMPROVEMENT IN SHOCK-CARRIAGE ATTACHMENTS TO HARVESTERS.

Specification forming part of Letters Patent No. 170,230, dated November 23, 1875; application filed August 9, 1875.

No. 6.

*To all whom it may concern:*

Be it known that I, JAMES O. BROWN, of Massillon, county of Stark, State of Ohio, have invented certain new and useful Improvements in Shock-Carriage Attachment to Harvesters, of which the following is a full, clear, and exact description, reference being had to the accompanying drawing, making part of this specification, in which—

Figure 1:
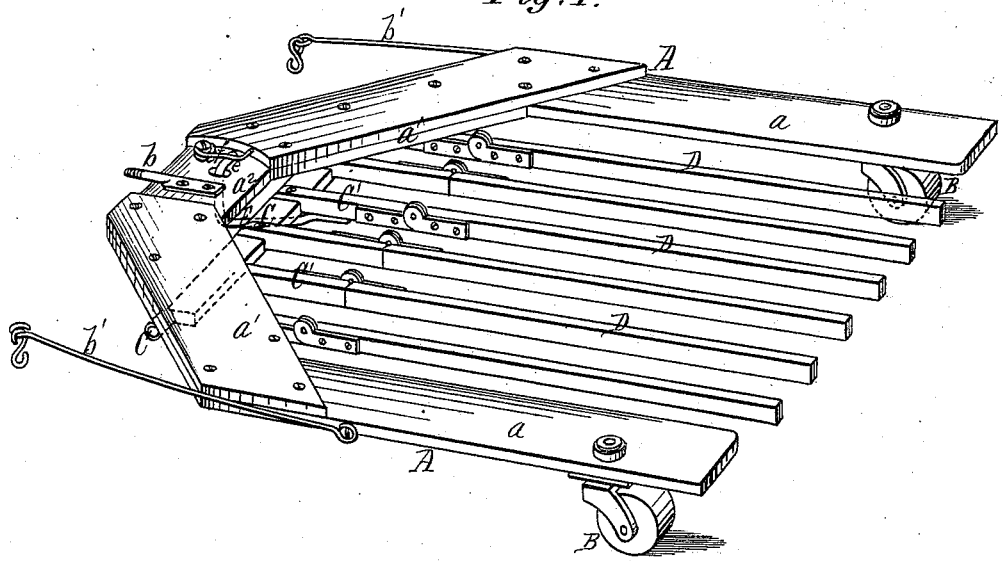
Figure 2:
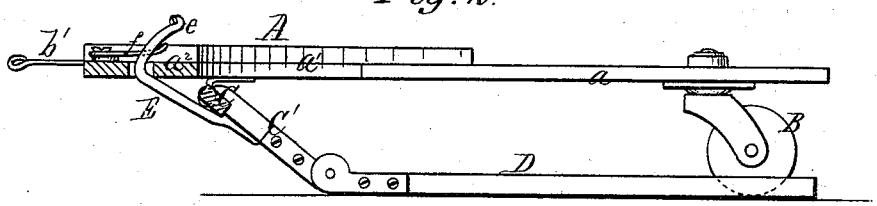

Figure 1 is a perspective view of a carriage attachment to harvesters, designed to receive the bundles, and, after the same have been formed or set up in a shock, to discharge the same, leaving it standing on the ground; and Fig. 2 represents a longitudinal section through the same.

Similar letters of reference denote corresponding parts in both figures.

My invention relates to a novel carriage attachment to harvesters, in which the grain is bound either by hand or automatically on the machine, said carriage being designed to receive the bound bundles, permit the same to be set up or formed into a shock, and then to deposit the shock in a standing position on the ground, as hereinafter explained.

In the accompanying drawing, A represents the main frame of the shock-carriage, which may be rectangular in form, but which, by preference, at its front, is made angular or three-sided, as shown in Fig. 1, as giving a bracing form, and, consequently, greater strength to the frame, which is left open at its rear. The timbers $a\ a\ a^1\ a^1\ a^2$, of which the frame A is composed, are made of sufficient width to constitute a platform on which the attendant can stand while manipulating the bundles. The forward bar $a^2$ has a swivel pin or bolt, $b$, by means of which it is to be connected with the frame of a harvesting-machine at the rear thereof, the carriage being thereby propelled or drawn over the ground, and also, at its forward end, maintained in uniform relation to the harvester-frame. In addition to the swiveling-pin $b$, jointed draft-rods $b'$ are attached at the sides or front corners of the frame A, and with the rear of the harvester-frame, these draft-rods relieving the pin or bolt $b$ of lateral strain, without interfering with the freedom of movement of the frame A in following the surface of the ground over which it is drawn. The side bars $a$, at their rear ends, are supported upon caster-wheels B B, which, in connection with the devices uniting the frame A to the harvester-frame, adapt said frame A to maintain a substantially uniform relation to the ground. Near the forward end of the frame A, in suitable bearings attached thereto, is mounted a transverse rock-shaft, C, to which a number of longitudinal arms, C', are rigidly connected, said arms being of uniform length, and to the rear ends of these arms bars D are jointed by hinges or butt-joints, which permit the bars D to rise above the plane of the arms C', but prevent them from falling below said plane, in such manner that when the arms C' are raised into a horizontal position, or one parallel with the frame-bars $a\ a$, the bars D will also be in a horizontal position, in the same plane with arms C', and in this position adapted to receive and support the bound bundles deposited thereon from the harvester. The rocking frame, composed of the shaft C and arms C', has an angular arm or lever, E, rigidly connected with it, said arm extending forward and upward through a perforation in, or by the side of, the forward bar $a^2$, and is provided at $e$ with a spur or tooth, which engages with a suitable spring-latch or locking device at $f$, by means of which the arm E is held depressed, with the arms C' held thereby in the position shown in Fig. 1.

The operation is as follows: Supposing the parts to be in position as shown in Fig. 1, the bundles, as received from the harvester, are formed into a shock, standing upon the bars D, by the attendant standing and moving upon the frame A, inclosing said bars D upon three sides. When the shock is completed, the attendant, with his hand or foot, trips the latch $f$, or releases the arm E therefrom, and the shaft C, rocked by the weight upon the arms C', allows the bars D, with the shock thereon, to drop upon the ground, in position as shown in Fig. 2, when the stubble, penetrating between the bars D, engages with the butts of the grain, holding the shock, while the bars D are drawn from beneath it by the forward movement of the machine, leaving the shock standing in good shape on the ground. The bars D are then raised by means of the hand or treadle lever arm E, the latter locked in position, and the operation is repeated as before.

It will be obvious that the form and construction of the frame or carriage, and of the devices connecting said carriage with the frame of the harvester, also the construction of the lever or treadle arm E and its locking-latch, and of the hinges supporting the bar D, may be varied without departing from my invention. I do not wish, therefore, to be confined to the precise construction and arrangement of said parts shown and described; but,

Having now described my invention, what I claim as new, and desire to secure by Letters Patent, is—

1. A shock-carriage attachment to harvesters, provided with a slatted dropper and a horizontal platform partially surrounding said dropper, and left open at the rear to permit the unobstructed escape of the standing shock, whereby the attendant is enabled to form and discharge the shock without stopping the machine, substantially as described.

2. The dropping slats or bars D, jointed to the vibrating arms C', and operating substantially as described, whereby their parallel relation to the ground is preserved, for the purpose and substantially as specified.

3. The jointed dropping slats or bars C' D, united to the carriage or frame through the medium of the transverse rocking shaft or bar C, substantially as described.

4. The shock carriage or frame A, supported at its rear by the caster-wheels B B, and at its front by the pivotal bolt or pin $b$, in combination with the jointed draft-rods $b'$ $b'$, permitting said carriage to maintain a parallel relation to the ground, as described.

5. The slatted platform D, pivoted to the platform or frame A, in combination with the lever-arm and latch for controlling said platform, substantially as described.

JAMES O. BROWN.

Witnesses:
J. L. BACHTEL,
S. A. CONRAD.